Figure 1A:
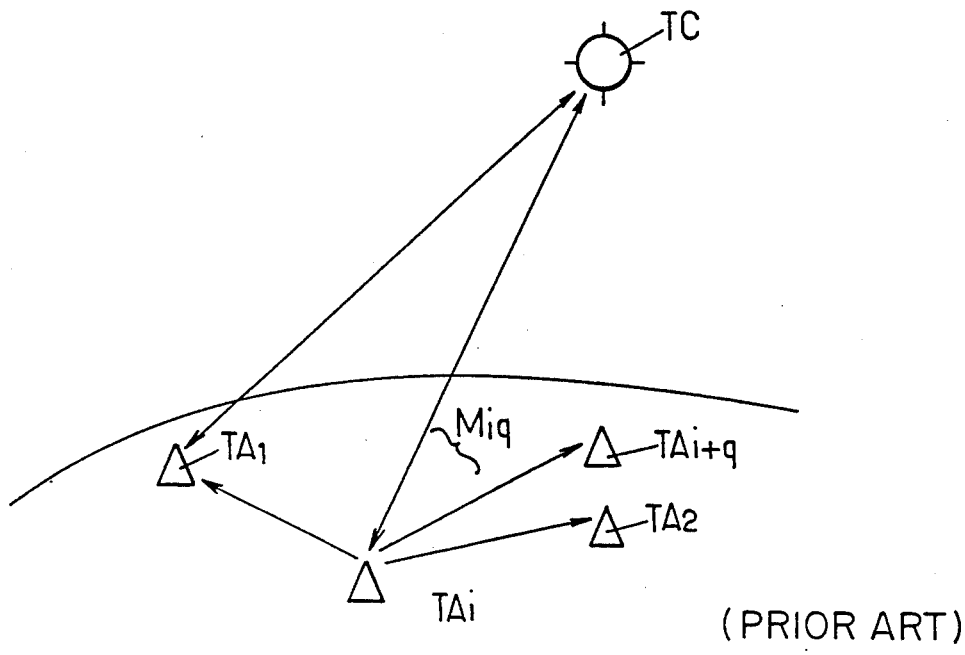

United States Patent [19]

Zein Al Abedeen et al.

[11] Patent Number: 5,327,432
[45] Date of Patent: Jul. 5, 1994

[54] PROTOCOL FOR MULTIPLE ACCESS TO A TELECOMMUNICATIONS CHANNEL FROM AUXILIARY TERMINALS BY DIGITIZED INFORMATION MESSAGES AND CORRESPONDING SYSTEM

[75] Inventors: Tarif Zein Al Abedeen, Toulouse; Gérard Maral, Goyrans, both of France

[73] Assignee: France Telecom, Paris, France

[21] Appl. No.: 60,794

[22] Filed: May 10, 1993

Related U.S. Application Data

[63] Continuation of Ser. No. 811,648, Dec. 23, 1991, abandoned.

[30] Foreign Application Priority Data

Dec. 26, 1990 [FR] France .................. 90 16269

[51] Int. Cl.$^5$ .............................................. H04J 3/16
[52] U.S. Cl. ............................. 370/95.3; 340/825.08
[58] Field of Search ............... 370/95.1, 95.2, 95.3, 370/85.1, 85.2, 85.3, 85.8; 340/825.51, 825.52, 825.07, 825.08

[56] References Cited

U.S. PATENT DOCUMENTS

| | | | |
|---|---|---|---|
| 4,774,707 | 9/1986 | Raychaudhuri | 370/95.1 |
| 5,003,534 | 3/1991 | Gerhardt et al. | 370/95.1 |
| 5,121,387 | 6/1992 | Gerhardt et al. | 370/95.3 |

OTHER PUBLICATIONS

IEE Proceedings Sections A a I, vol. 130, No. 4, Part F, Jun. 1983, pp. 343-349, Old Woking, Surrey, GB; H. Mine et al.: "Delay Analysis of a Satellite Channel Reservation System with Variable Frame Format".
IEEE Journal on Selected Areas in Communications, vol. 6, No. 1, 1988, pp. 210-222, New York, U.S.; K. Joseph et al.: "Simulation Models for Performance Evaluation of Satellite Multiple Access Protocols".

*Primary Examiner*—Douglas W. Olms
*Assistant Examiner*—Ajit Patel
*Attorney, Agent, or Firm*—Larson and Taylor

[57] ABSTRACT

The invention concerns a protocol for multiple access to a networked telecommunications channel. A current auxiliary terminal of a plurality of auxiliary terminals address reservation messages to a central terminal. The latter addresses to the current auxiliary terminal an allocation message of transmission capacity in terms of number of data packets of an information message of the current auxiliary terminal dedicated to another auxiliary terminal. The reservation messages are provided with an item of information relating to the number of data packets forming the information message of current auxiliary terminal, stored but not yet transmitted to the other auxiliary terminal, which are thus present between the last allocation message reception and the current reservation message transmission of given order, so that stability of the channel is improved.

12 Claims, 7 Drawing Sheets

PROTOCOL FOR MULTIPLE ACCESS TO A TELECOMMUNICATIONS CHANNEL FROM AUXILIARY TERMINALS BY DIGITIZED INFORMATION MESSAGES AND CORRESPONDING SYSTEM

This application is a continuation of application Ser. No. 07/811,648 filed Dec. 23, 1991 now abandoned.

The invention relates to a protocol for multiple access to a telecommunications channel from auxiliary terminals by digitized information messages and to the corresponding system.

In the field of satellite communication, for example, a communication network usually comprises a plurality of auxiliary terminals, TAi, placed on the Earth's surface, and a central terminal, TC, carried on board at least one satellite, a plurality of satellites, each carrying a central terminal possibly, if appropriate, being provided so as to ensure, if necessary, coverage of a specified land area. In any event, the central terminal TC may also be placed in an earth station without exceeding the scope of the subject of the invention.

The users may then, from the abovementioned auxiliary terminals TAi, forming a ring, exchange information messages Mi from one point to another of the network, via the telecommunications channel.

The network may also be formed either as a network with centralized configuration, the transmission of the information messages Mi being performed directly from an auxiliary terminal to another auxiliary terminal, or as a network with distributed configuration, autonomous management of each terminal being carried out according to this configuration, in the absence of a central terminal.

In the case of the centralized configuration, the management of the multiple access of an auxiliary terminal TAi+q is carried out via the central terminal TC by means of reservation request messages MR addressed by each auxiliary terminal TAi to the central terminal TC and of allocation messages MA addressed in response by the central terminal TC to this same auxiliary terminal.

The access management procedure generally used by the central terminal TC consists, according to a known technique, in allocating to the auxiliary terminals TAi, and to their users, in a dynamic manner, a transmission path distributed temporarily following a request, rather than allocating a spatially discriminated transmission path. In this way, two types of message are then transmitted, reservation messages and data or information messages.

According to a particular conventional embodiment of demand-assignment multiple access system (DAMA), known by the name of ALOHA-reservation protocol, used mainly for satellite network intercommunication, each auxiliary terminal TAi transmits a short reservation message MR and then an information message MI. The reservation message, as represented at point b) of FIG. 1, contains information relating to the number of time intervals Ts required to ensure the transmission of the relevant information message MI.

As has been represented in the abovementioned FIG. 1, the ALOHA-reservation protocol employs frames of fixed structure. The temporal path is subdivided into time intervals whose duration Ts is equal to the duration of transmission of a data packet for a transmission rate of value R. The time intervals Ts are organized into a frame comprising in total F intervals, the frame being likewise subdivided into a reservation sub-frame, comprising K intervals, and into a data sub-frame comprising L intervals. Each time interval Ik of the reservation sub-frame, called reservation interval respectively data sub-frame, called data interval, is, in its turn, divided into corresponding sub-interval IkJ, each abovementioned sub-interval, as a function of its qualification, being intended to ensure the transmission of reservation messages according to the abovementioned ALOHA protocol.

Thus, a data message or information message MI consists of at least one data packet and requires therefore, with a view to its transmission, the transmission capacity of one or more data intervals. When a user generates an information message MI from a specified auxiliary terminal TAi, he transmits jointly a reservation message MR, which contains the information relating to the number of packets of the information message MI, that is to say of the number of information intervals required to ensure the transmission of this message. When the reservation message is transmitted successfully, that is to say when the reservation message MR has been transmitted and received by the central terminal TC, the latter is then stored in a reservation memory whose objective is to ensure the successive storage of any reservation message MR transmitted by any auxiliary terminal TAi, the set of abovementioned stored reservation messages being formed into a queue. Management of the queue is then ensured according to a first-in first-out mode (FIFO) according to the order of reception of the reservation messages. The management of the stored reservation messages is performed from the previously described reservation sub-frames, these permitting implementation of the procedure below:

A user generating an information message MR in a frame, also transmits a reservation message MR transmitted during a sub-interval of time selected randomly in the K.V time sub-intervals of the reservation sub-frame of the following frame. The information message MI, or a part thereof, is not transmitted to a given destination terminal TAi+q until after reception of an allocation message generated by the central terminal TC.

The reservation message of a user which, in the vicinity of a given auxiliary terminal TAi, suffers a specified delay in the reception of the acknowledge receipt, is considered not to have been transmitted validly. This reservation message MR is then again transmitted in a frame chosen randomly from a specified number Z of subsequent successive frames.

The transmission system according to the previously described ALOHA protocol is satisfactory. However, one of the problems relating to the implementation of the latter consists in the fact that the reservation messages MR or reservation sub-frame, may, under certain conditions, make the system formed by the network unstable. Such a difficulty is entirely known from the transmission systems according to the ALOHA protocol and, for a more complete study of this problem, useful reference can be made to the publication by K. KLEINROCK entitled "Queueing systems", Vol. II, published in the Journal "Computer Applications", New York: Wiley 1976.

Generally, it will be regarded that the above-mentioned instability phenomenon appears during sizeable fluctuations in the traffic, the network drifting from its nominal operating point to enter a self-locking situation in which the capacity for processing the reservation messages, and, consequently, the information messages, becomes practically nil, neither the reservation messages MR nor the allocation messages MA being able to be transmitted normally.

The object of the present invention is to remedy the abovementioned disadvantage, by implementing a stabilized protocol for multiple access to a telecommunications channel from auxiliary terminals by digitized information messages.

Another objective of the present invention is the implementation of a system for multiple access to a telecommunications channel from auxiliary terminals by digitized information messages permitting the implementation of the abovementioned stabilized access protocol.

The protocol for multiple access to a telecommunications channel from auxiliary communication terminals by digitized information messages which is the subject of the present invention, in which an auxiliary terminal addresses to a central terminal a reservation message and the central terminal addresses to the auxiliary terminal an allocation message corresponding to the information message generated, heading for another auxiliary terminal, by the auxiliary terminal from a plurality of successive elementary information messages (mj), is notable in that each reservation message of order p relates to the set of earlier successive elementary information messages generated, stored and not yet transmitted by the auxiliary terminal to the other auxiliary terminal between the earlier instant of reception, by the auxiliary terminal, of an allocation message of order p-n, transmitted by the central terminal and the instant of transmission by the auxiliary terminal of the reservation message of order p.

The protocol for multiple access to a telecommunications channel from auxiliary communication terminals by digitized information message, which is the subject of the present invention, finds application in the management of satellite telecommunication networks for example and, more generally, of any fixed or mobile network in which access management as well as identification and/or location of auxiliary posts or terminals is carried out from a central or decentralized post or terminal.

Figure 1B:
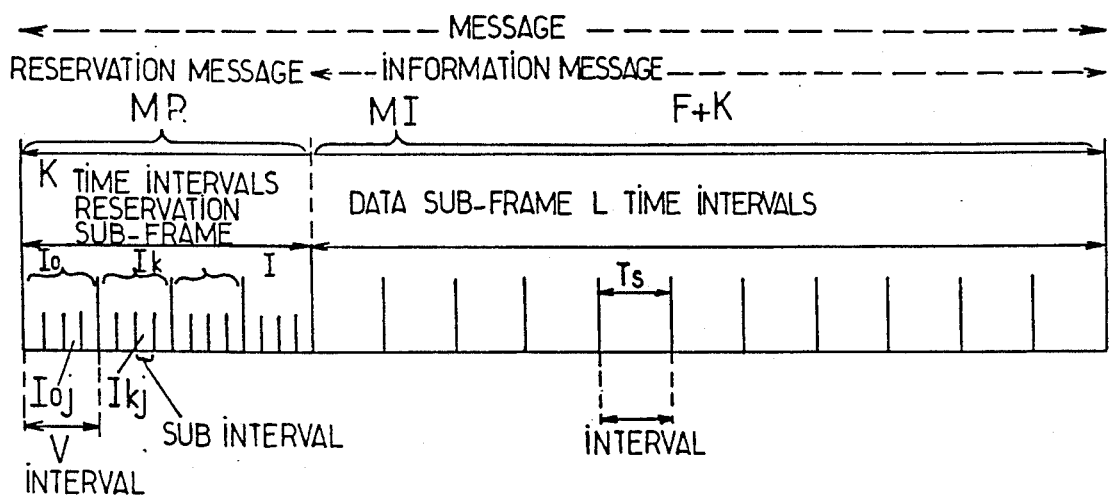

A more detailed description of the protocol for multiple access to a telecommunications channel from auxiliary communication terminals by digitized information messages, which is the subject of the present invention, will be given below in the description and the drawings in which, in addition to FIGS. 1a and 1b representing a network of terminals consisting of a central terminal and auxiliary terminals implementing a multiple access protocol of conventional ALOHA type:

FIGS. 1a and 1b show the prior art communication system.

Figure 2:
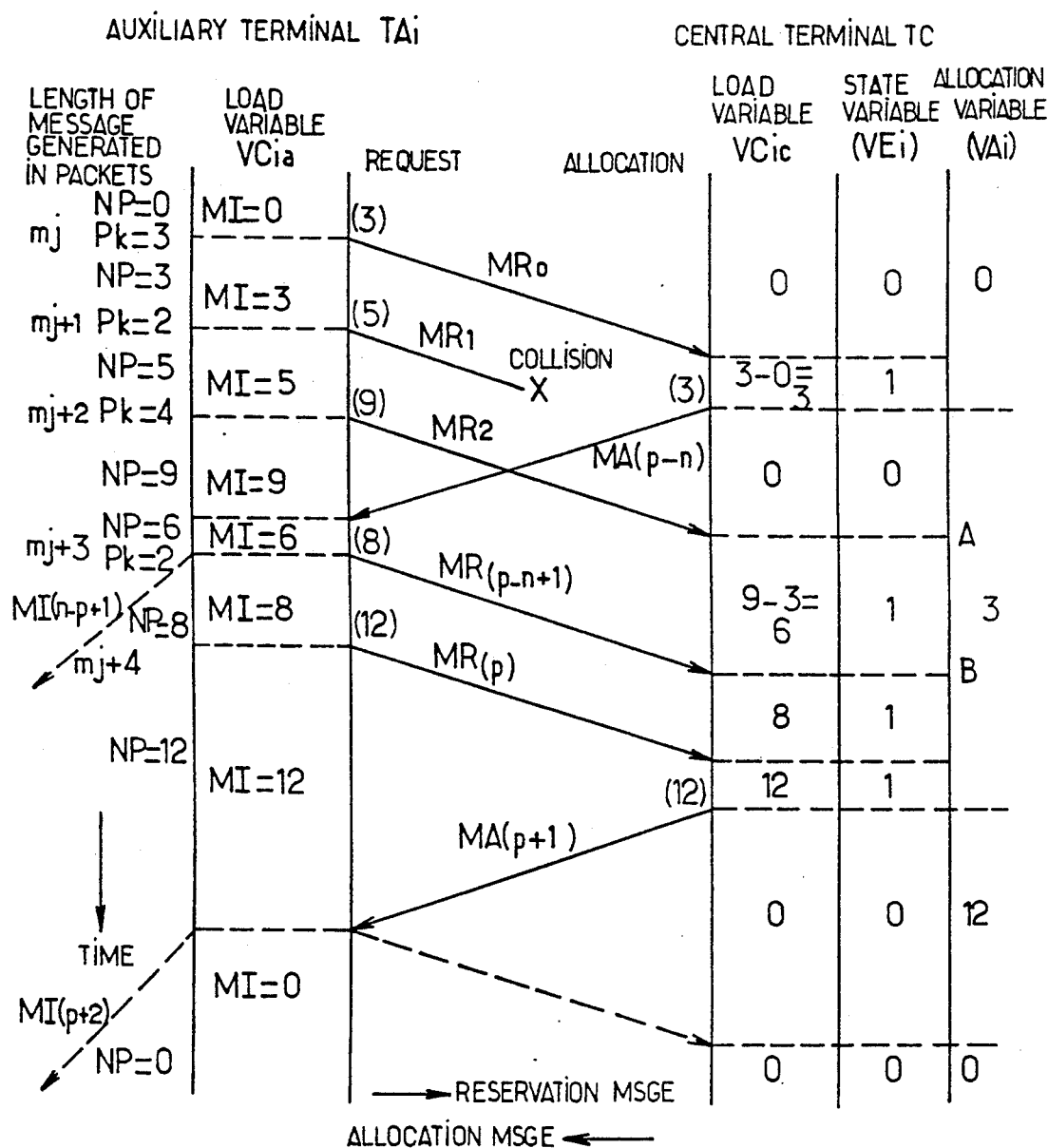
Figure 3A:
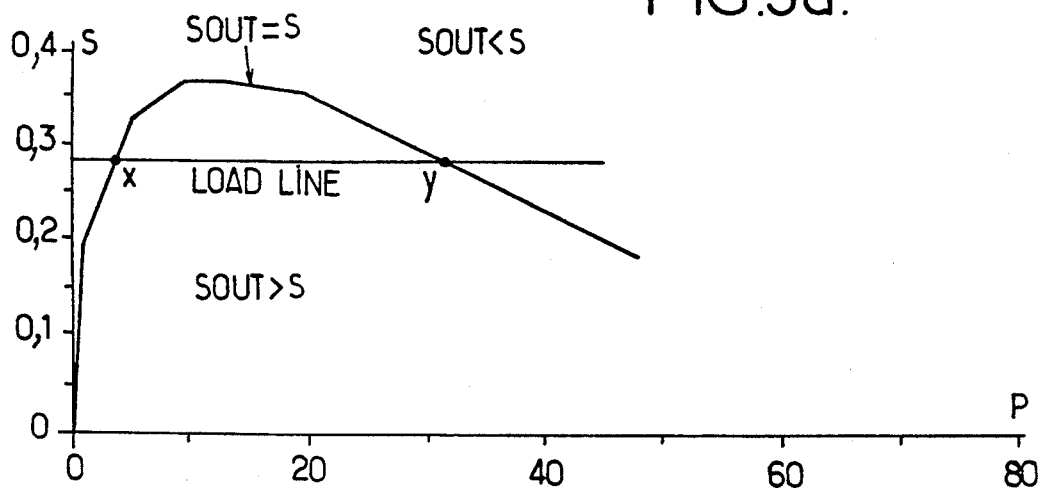
Figure 3B:
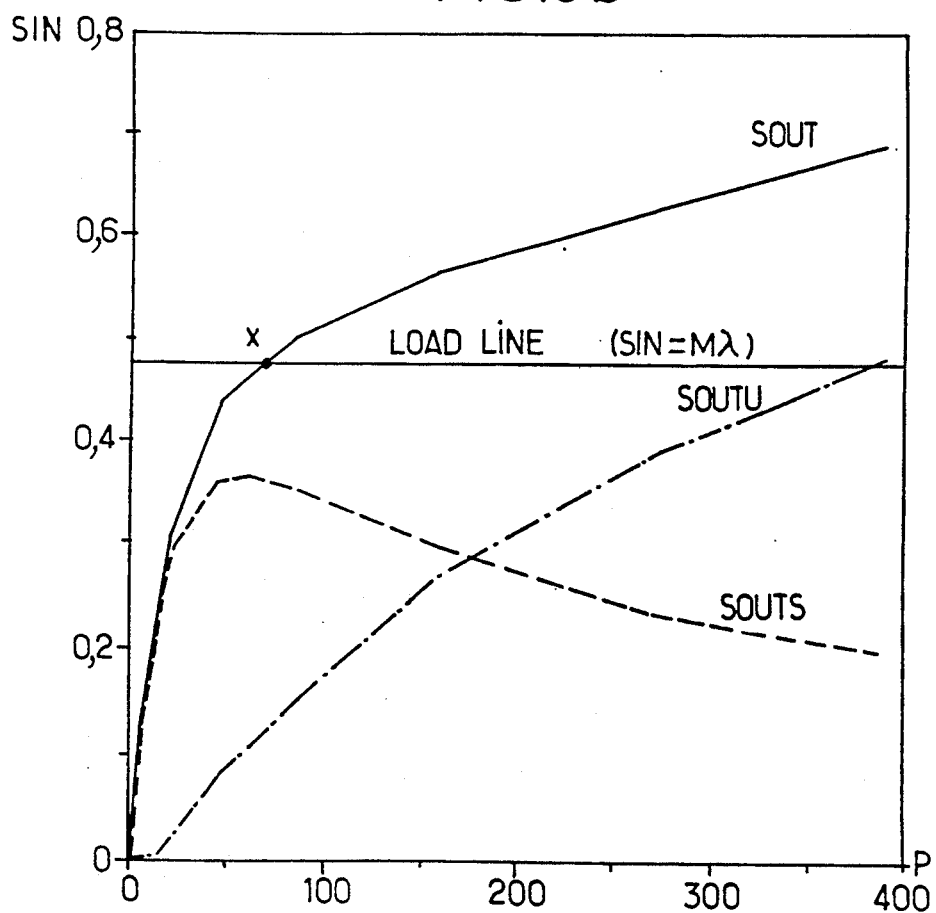
Figure 4A:
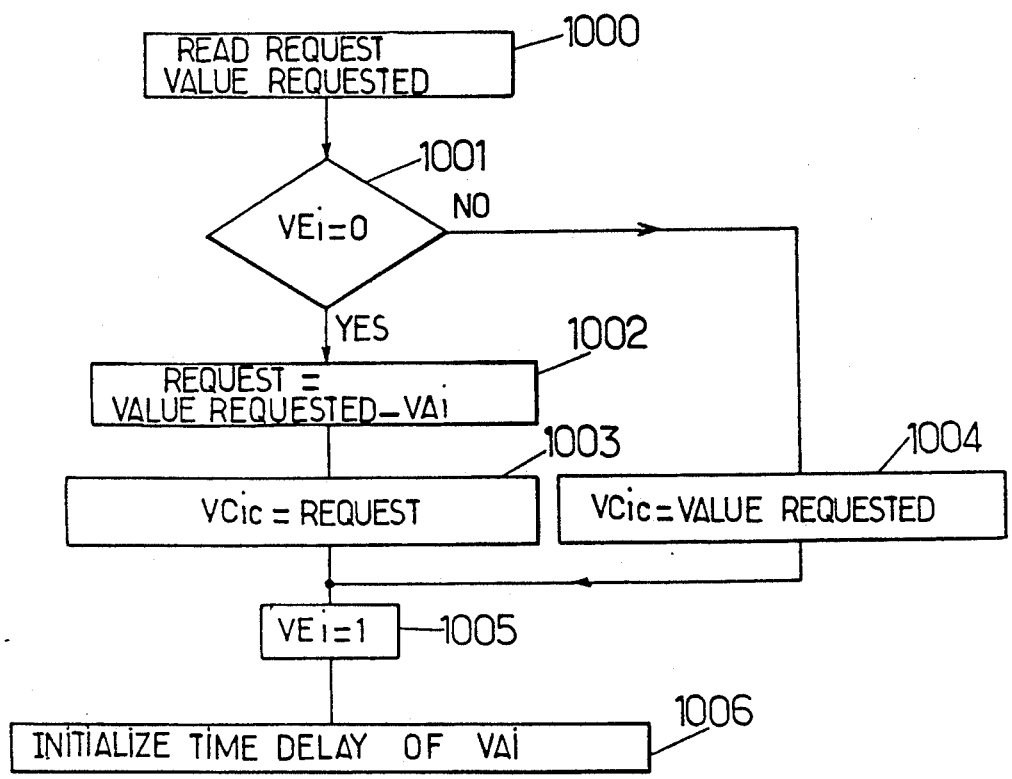
Figure 4B:
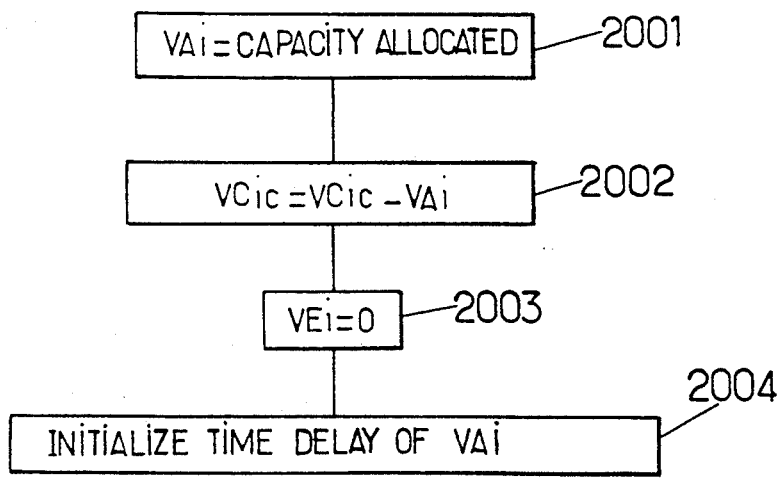
Figure 5A:
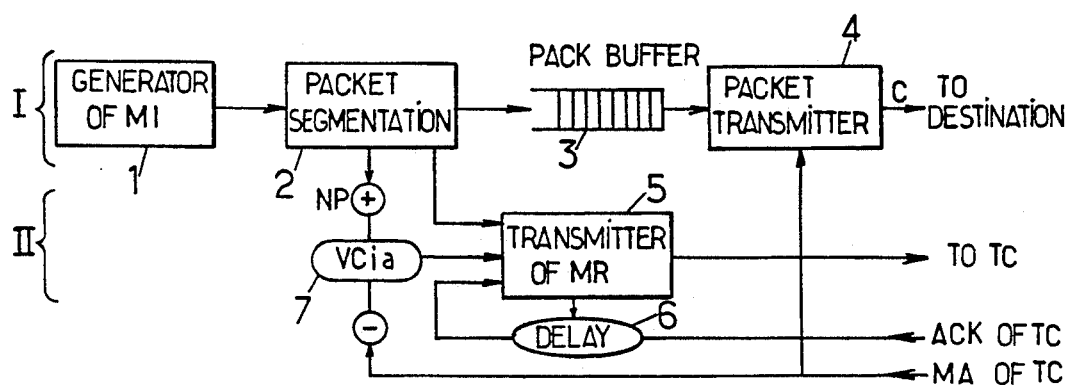
Figure 5B:
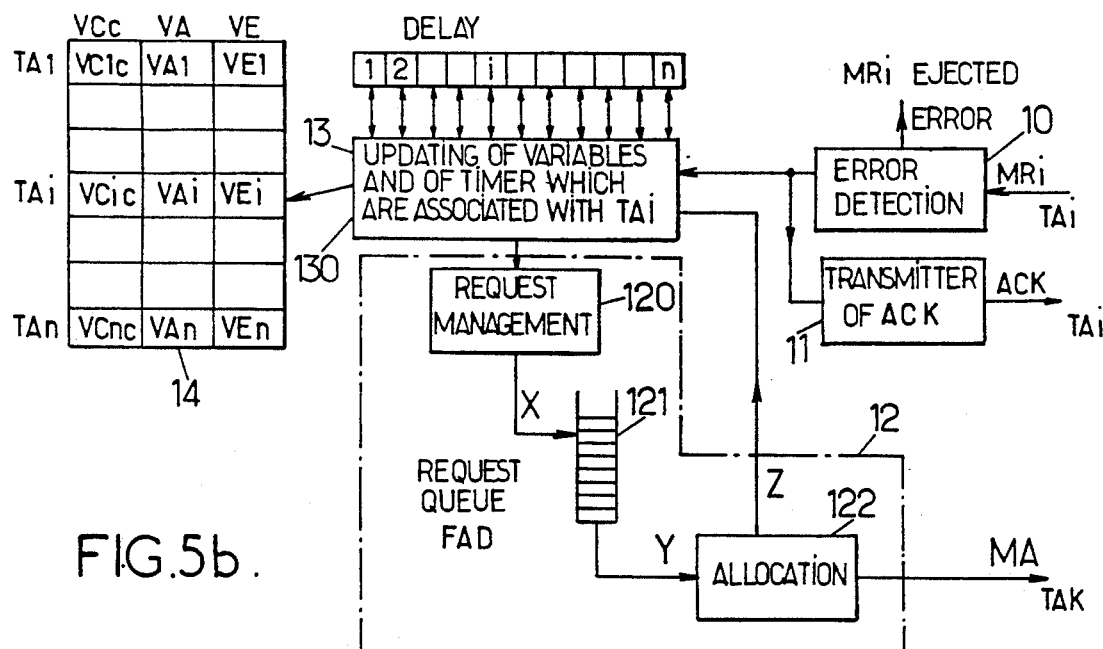
Figure 5C:
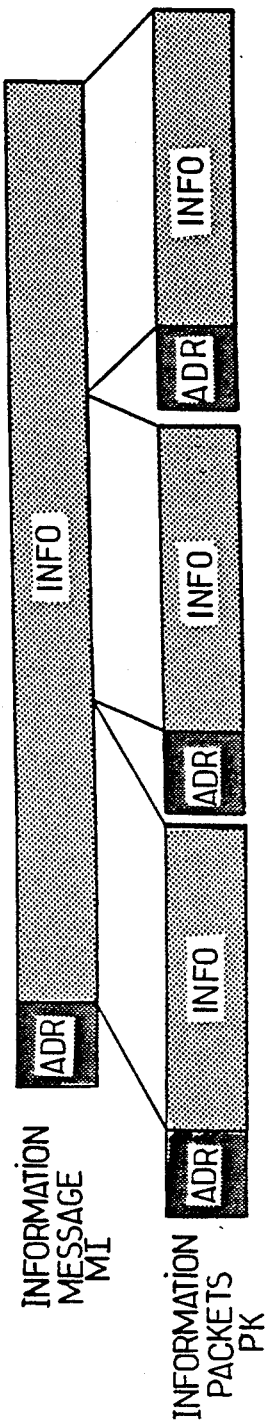
Figure 5C:
Figure 5C:
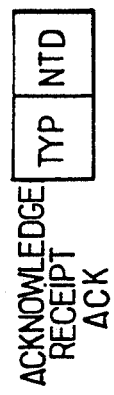
Figure 5C:
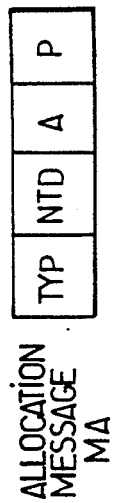
Figure 6:
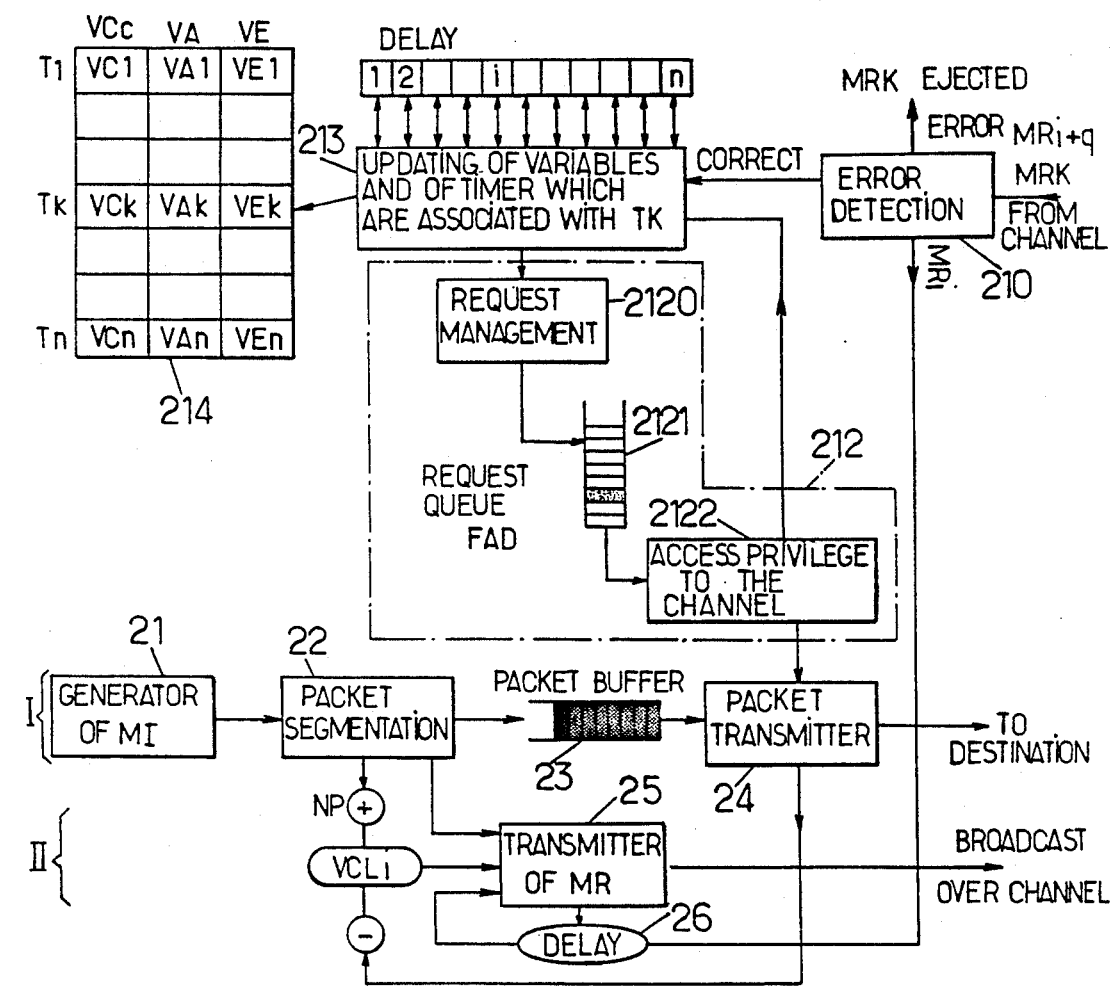

FIG. 2 represents, illustratively, the successive steps for implementing the stabilized protocol for multiple access which is the subject of the present invention, FIG. 3a represents an explanatory diagram of the equilibrium conditions in a network of terminals implementing a protocol for multiple access to a telecommunications channel according to a conventional ALOHA protocol, FIG. 3b represents an explanatory diagram of the equilibrium conditions in a network of terminals implementing a protocol for multiple access to a telecommunications channel in accordance with the protocol according to the invention, FIG. 4a represents a flow diagram of the steps of the procedure for implementing the protocol for multiple access to a telecommunications channel, in the vicinity of the central terminal, upon reception of a reservation message transmitted by any auxiliary terminal TAi, FIG. 4b represents a flow diagram of the steps of the procedure for implementing the protocol for multiple access to a telecommunications channel, in the vicinity of the central terminal, upon transmission, to an auxiliary terminal TAi, of an allocation message, FIG. 5a represents a block diagram of an auxiliary terminal in the case of a network with centralized configuration, FIG. 5b represents a block diagram of a central terminal in the case of a network with centralized configuration, FIG. 5c represents, in the case of a network of centralized configuration type, an exemplary structure of transmitted messages, information, reservation, acknowledge receipt and allocation messages, FIG. 6 represents a block diagram of a terminal used in the case of a network with distributed configuration.

The protocol for multiple access to a telecommunications channel from auxiliary communication terminals by digitized information messages which is the subject of the present invention will be described in connection with FIG. 2.

Generally, the network of terminals for intercommunications will be regarded as a network whose structure is of centralized configuration type.

However, the principle of implementation of the multiple access protocol subject of the present invention remains completely applicable to a network with distributed configuration.

As in the case of the networks of terminals for intercommunications of the prior art, the network permitting implementation of the multiple access protocol subject of the present invention consists of M auxiliary terminals, denoted TAi, and a central terminal, denoted TC.

The auxiliary terminals generate variable-length messages and cut the latter up into packets of fixed size. The unit of transmission capacity, corresponding to a data interval or to a reservation interval of duration Ts, as described previously in connection with FIG. 1, is therefore the capacity required for the transmission of a packet.

Thus, each auxiliary terminal TAi makes it possible to ensure the communication by digitized information messages Mi to another auxiliary terminal denoted TAi+q, the auxiliary terminal TAi further addressing to the central terminal TC a reservation message MR.

In response, the central terminal TC addresses to the abovementioned auxiliary terminal TAi an allocation message MA corresponding to the information message MI.

Generally, each auxiliary terminal is capable of generating the corresponding information message MI from a plurality of successive elementary information messages, denoted mj.

It will of course be understood that the above-mentioned information messages MI may be generated by conventional concatenation of the successive elementary messages mj.

In FIG. 2 has been represented a time diagram of the protocol for multiple access to a channel, from auxiliary terminals which accord with the subject of the present invention. Firstly, it will be understood that the order of the messages, reservation messages MR, information messages MI, transmission capacity allocation messages MA, is defined as a succession of events at arbitrary relative instants referenced in the vicinity of the relevant auxiliary terminal TAi. Thus, two successive instants of order $p-n$ then $p-n+1$ for example, may exhibit any time value.

Thus as has been further represented in FIG. 2, and in accordance with a particularly advantageous aspect of the protocol for multiple access to a telecommunications channel from auxiliary terminals which are the subjects of the present invention, each reservation message of order p, denoted MRp, relates to the set of earlier successive elementary information messages mJ which have been generated, stored and not yet transmitted by the auxiliary terminal TAi to the different auxiliary terminal TAi+q, these elementary information messages mJ therefore being present in the vicinity of the relevant auxiliary terminal TAi between the earlier instant of reception by this auxiliary terminal TAi of an allocation message of order $p-n$, this allocation message being denoted MAp−n transmitted by the central terminal TC and the instant of transmission by the auxiliary terminal of the reservation message of order p, a reservation message denoted MRp.

A particular concrete example of operating mode of the multiple access protocol which is the subject of the present invention will be given in connection with FIG. 2.

It is regarded at the start of the procedure for implementing the multiple access protocol which is the subject of the present invention, as represented in FIG. 2, that for the relevant auxiliary terminal TAi, the length of the information message MI in terms of number of packets is equal to 0, the central terminal TC in respect of the corresponding auxiliary terminal TAi being, in the initial value allocation situation, also equal to 0.

With an elementary information message mJ being generated by a user in the vicinity of the auxiliary terminal TAi, this elementary message having for example a length in terms of number of packets NP=3, the length of the information message MI takes in its turn the value 3.

The relevant auxiliary terminal TAi, following the user's request, then generates a reservation message, denoted MR0, addressed to the central terminal TC in respect of a reservation request corresponding to the length of the message MI, namely to three packets Pk.

The reservation request having been recorded by the central terminal TC, this request is placed in a queue as described earlier in the description.

Since the transmission of an allocation message by the central terminal TC to the relevant auxiliary terminal TAi is not simultaneous, by virtue of the management of the queue, the user of the auxiliary terminal TAi generates for example a new elementary information message, denoted mj+1, the length of which, by way of non-limiting example, corresponds to a number, two packets Pk, the value of the length of the message MI then being updated to the sum of the values of the current lengths and of the earlier lengths, namely, in the given example, MI=5 in terms of number of packets.

In FIG. 2, in the vicinity of the above-mentioned auxiliary terminal TAi, it will then be noted that the auxiliary terminal TAi, following the creation by the user of the new elementary information message mj+1, and therefore of the information message MI of length 5, generates a new reservation message MR1 in respect of a reservation request corresponding to the length of the information message MI, namely in respect of 5 data packets.

A collision, denoted X in FIG. 2, being assumed, the collision being defined in fact as the absence of reception of the reservation message MR1 described earlier by the central terminal TC, it will be understood that the potential situation of transmission capacity allocation by the central terminal TC in respect of the relevant auxiliary terminal TAi, remains equal to 3, the length of the transmission capacity space able to be allocated by the central terminal TC in respect of the auxiliary terminal TAi following the earlier reception of the reservation message MR0.

Concomitantly, the user of the auxiliary terminal TAi was able to generate a new elementary message mj+2, the length of which in terms of number of data packets is for example equal to 4, the total number of packets then taking the value NP=9, and the corresponding information message MI taking this same value.

The auxiliary terminal TAi then transmits to the central terminal TC a reservation message MR2 in respect of a memory reservation request equal to 9 in terms of number of packets.

Following the management of the queue in the vicinity of the central terminal TC, the latter makes it possible to generate, heading for the relevant auxiliary terminal TAi, an allocation message denoted MAp−n at an instant which is not correlated relative to the instant of reception of the reservation message MR2 mentioned previously, this allocation message MAp−n authorizing the auxiliary terminal TAi to transmit an information message MI, the length of which in terms of number of packets is equal to 3.

The allocation message MAp−n then allows the length of the information message MI to be reduced, in terms of number of packets Pk, from the value 9 to the value 6 on transmission, by the auxiliary terminal TAi, of an information message denoted MIn−p+1, of length 3, heading for the other auxiliary terminal denoted TAi+q.

The procedure for the multiple access protocol which accords with the subject of the present invention may then be proceeded with as given by way of example in FIG. 2.

Following the transmission of the information message MIn−p+1, the length of the information message MI stored in the vicinity of the auxiliary terminal TAi is equal to 6. Assuming the creation, by the user of the auxiliary terminal TAi, of a new elementary information message denoted mj+3 of length, in terms of number of packets, equal to 2, the length of the information message MI then becomes equal to 8 and the auxiliary terminal TAi may then generate a reservation message, denoted MRp−n+1, in respect of a memory allocation equal to 8 in terms of number of packets, this reducing the transmission capacity allocation situation in the vicinity of the central terminal to this value.

The creation by the user of the auxiliary terminal TAi, of a new elementary message mj+4 of length 4 in terms of number of packets allows the auxiliary terminal TAi to update the length of the information message MI to the value 12 and to address to the central terminal TC a new reservation message, denoted MRp, in respect of the abovementioned value 12, and which will be processed according to the management of the queue mentioned previously.

The processing of the abovementioned memory allocation value 12 is then performed by the central terminal TC by the transmission of an allocation message, denoted MAp+1, to the relevant auxiliary terminal TAi in respect of the corresponding transmission capacity space of value 12 in terms of number of packets, this allowing for example, following transmission by the auxiliary terminal TAi of an information message denoted MIp+2 to the other auxiliary terminal TAi+q, the value of the length of the information message MI, expressed in terms of number of data packets, to be reduced, in the vicinity of the auxiliary terminal TAi, to the value 0.

Of course, in the vicinity of the terminal TC, the memory allocation situation in respect of the auxiliary terminal TAi has been reduced to 0 following transmission of the allocation message MAp+1 described previously.

Justifying evidence for the stability of the multiple access protocol which is the subject of the present invention will now be given in connection with FIG. 3.

The performance of the ALOHA-reservation protocol has formed the subject of significant work. Among the latter can be cited the articles by L. KLEINROCK mentioned previously, by D. HAYCHAUDHURI and K. JOSEPH "Simulation Models for Performance Evaluation of Satellites Multiple Access Protocol" IEEE ISAC, January 1988, and by L. ROBERTS "Dynamic Allocation of Satellite Capacity Through Packet Reservation" AFPIS Conference Proceedings, Vol. 42, pp 771–716, 1973.

The present Justifying evidence is based on the study of the stability of the reservation sub-frame in the absence of residual accumulation of reservation messages not processed by the queue of the central terminal TC.

The network is considered to comprise M auxiliary stations TAi. Under these conditions, it is appropriate to formulate the assumption according to which the subdivision of the temporal transmission path into a reservation sub-frame and a data sub-frame, as represented in FIG. 1, is equivalent to a subdivision, in the frequency space, of the pass band of the satellite transmission path into two distinct continuous temporal sub-paths, one reservation sub-path and one data sub-path. For a transmission rate of value R of the temporal frame, the transmission rate of the reservation sub-paths Rr, respectively data sub-path Rd, is given by the relationships:

$$Rr = R \frac{K}{K+L} \;;\; Rd = R \frac{L}{K+L}$$

Thus, for a time reference identical for the temporal transmission path and for the distinct continuous temporal transmission sub-paths, reservation sub-path and data sub-path, the number of bits transmitted during a time interval is the same, and the duration of the time interval of the reservation sub-path satisfies the relationship:

$$Ts = \frac{R}{Rr} \cdot TS = TS \frac{K+L}{K}$$

The same is true for any temporal subdivision of the time interval, in particular for the corresponding time sub-intervals IkJ, which, in respect of the reservation sub-path, will for this reason be designated by expanded sub-intervals Ikje.

For a probability λ of creation of an information message MI by an auxiliary terminal TAi, the probability of creation, by this auxiliary terminal, of a reservation message in an expanded time interval is the same.

For a given expanded time interval, the number of reservation messages MR which will be retransmitted by the auxiliary terminal TAi is equal to B. The propagation time, auxiliary terminal, central terminal, auxiliary terminal being denoted Pr, a situation of collision of a reservation message, in the case of a network with centralized configuration, is known after 2 Pr expanded time sub-intervals after transmission by the latter. Whereupon, the auxiliary terminal TAi continues with the retransmission of the reservation message MR in an expanded time sub-interval selected randomly from the Rtx succeeding time sub-intervals.

A probability P of selection of a given time sub-interval by the relevant auxiliary terminal TAi, with a view to retransmitting one of its B reservation messages MR, this probability, when the B reservation messages MR are to be transmitted, during the period 0, 2 Pr+Rtx, satisfies the relationship:

$$P = \frac{B}{2Pr + Rtx}$$

The principle of total probabilities, applied to the determination of the probability of successful transmission Pr(s) of a reservation message in an expanded time sub-interval can be written:

$$Pr(s) = Pr(n) + Pr(sr)$$

a relationship in which:
Pr(n) representing the probability of creation of a new reservation message, and of successful transmission, satisfies the equation: Pr(n)=M.Pr(1)×Pr(o), Pr(1) designating the probability of creation of a message by a single auxiliary terminal Tai, Pr(o) designating the probability of nonretransmission of a message by any other auxiliary terminal TAi+q, and
Pr(sr) representing the probability of successful retransmission of this message, satisfies the equation:

$$Pr(sr) = M.Pr(s\text{-}i\text{-}t\text{-}e) \times Pr(o\text{-}n\text{-}m)$$

Pr(s-i-t-e) designating the probability of selection of the relevant expanded time sub-interval by an auxiliary terminal TAi to ensure retransmission and Pr(o-n-m) designating the probability of noncreation of a message during the abovementioned expanded time sub-interval.

In short, the processing capacity, expressed in terms of probability, of the reservation sub-path can be written, being in mind the approximation according to which M is very large and λ small, for a product S=M. constant, $$Sout = e^{-S}(1-P)^{M-1}(S+MP)$$

The network is said to be in equilibrium when the rate of traffic, consisting of the set of messages created, is equal to the processing capacity of the reservation sub-path: namely for S=Sout The equilibrium contour of the network, obtained for the abovementioned condition, is represented in FIG. 3a, the equilibrium contour subdividing the plane S, P into two zones corresponding to Sout>S and to Sout>S. For an effective traffic of given value S=M. λ, the corresponding load line cuts the equilibrium contour in two points x and y, these points being designated under the conditions of use of the relevant network, as equilibrium points of the latter.

It is demonstrated that the point x situated on the equilibrium contour, in a zone of positive slope, is stable, whereas the point y, situated in a zone of negative slope, is unstable.

However, the network at the point x is not unconditionally stable, by virtue of the existence of the 10 equilibrium point y, which is essentially unstable; the risks of passing from the point x to the unstable point y are substantial when the traffic increases, and whence consequently is the risk of instability.

In the case of the protocol which is the subject of the present invention, by contrast, for a number P of stored information messages queueing for transmission in the auxiliary terminals TAi, the input traffic flow of messages into the reservation system, regarded overall as a global memory, can be written Sin=M.λ. A reservation message MRp frees the global memory either in the case of successful transmission, or in the case where this memory does not require a retransmission. It is recalled here that a reservation message MRp does not require retransmission in the case where a succeeding reservation message MRp+1 is generated by the same auxiliary terminal after the message MRp but before the time delay period of the reservation message MRp. Thus, the flow of output traffic Sout is the sum of two components, that corresponding to the successfully transmitted reservation messages Souts, in similar fashion to the conventional ALOHA-reservation method represented in FIG. 3a, and that Soutu corresponding to the unsuccessfully transmitted reservation messages, for which no acknowledge receipt message was received, but which were not subject to retransmission during the time delay period. The corresponding curves for the parameters Sout=Souts+Soutu as a function of the number P of messages are represented in FIG. 3b, these curves having been obtained following trials for a configuration M=150 auxiliary terminals, a reservation sub-frame capacity of 400 sub-intervals in 600 ms, the retransmission time-delay period being made equal to 20 sub-intervals. The volume of input traffic is modified by modification of the load of the auxiliary terminals λ.

It will be noted, on observation of FIG. 3b, that there is now just one point x of intersection of the load line Sin=M.λ with the characteristic Sout, this point x being unconditionally stable, whatever the value of the input traffic Sin. It was also possible to observe, during fluctuations in the traffic load, a corresponding variation in the operating point x about the corresponding stable equilibrium position. The characteristic Soutu thus compensates for the characteristic Souts for high values of P.

Thus, the multiple access protocol which is the subject of the present invention, allows for the earlier ALOHA reservation protocol, in which for each elementary information message created, a reservation message is generated, to be substituted by a more suitable protocol in which a single reservation message is generated for the set of created, not yet transmitted elementary messages.

A more detailed description of the procedure for implementing the protocol for multiple access to a channel from auxiliary terminals, which are the subjects of the present invention, will now be given in connection with FIG. 2, and with FIGS. 4a and 4b.

Generally, it will be imagined that the information messages MI are transmitted by a relevant auxiliary terminal TAi to a different auxiliary terminal denoted TAi+q, this transmission being performed according to an order p−n+1, the information message MIp−n+1 being transmitted according to an order immediately higher than each allocation message of order p−n, the message denoted MAp−n received by the relevant auxiliary terminal TAi.

Of course, an arbitrary period will be imagined between the two successive events of order p−n and p−n+1.

Similarly, the elementary information messages mj and the information messages MIp−n+1 transmitted and formed from the latter are regarded as of arbitrary lengths and subdivided into packets, denoted pK, of fixed arbitrary length.

Thus, each reservation message of order p, denoted MRp, transmitted by each auxiliary terminal TAi, contains an item of information representing the number of packets NP stored in the vicinity of the auxiliary terminal TAi and queueing for transmission to the other previously mentioned auxiliary terminal.

According to a particularly advantageous non-limiting implementation of the procedure of the multiple access protocol which is the subject of the present invention, the reservation-allocation procedure can be implemented from two load variables, a transmission capacity load variable, expressed in terms of number of data packets, for the relevant auxiliary terminal TAi, this load variable being denoted VCia and a transmission capacity load variable for this same relevant terminal TAi, in the vicinity of the central terminal, this load variable being denoted VCic.

Generally, it will be understood that the variable VCia is updated after creation of a new message and after reception of an allocation message MA on the part of the central terminal TC.

In this way, this variable permanently indicates the number of data packets queueing in the vicinity of the corresponding auxiliary terminal TAi.

The variable VCic is updated after reception of a reservation message on the part of the auxiliary terminal TAi and after transmission of an allocation message MA to the corresponding auxiliary terminal TAi. Thus, the variable VCic is used by the central terminal TC each time there is reason to allocate a transmission capacity to the relevant auxiliary terminal TAi in order to determine the capacity required by the abovementioned auxiliary terminal at this instant.

Thus as will be noted on observation of FIG. 2, the variable VCic of transmission capacity load state of the central terminal TC includes a first sub-variable, denoted VAi, designated by transmission capacity allocation variable for the corresponding auxiliary terminal TAi having generated the reservation message and a state variable, denoted VEi, characteristic, for the relevant auxiliary terminal TAi, of the state of requests or absence of request for memory allocation.

Thus, each time the central terminal TC transmits an allocation message MA to the relevant auxiliary terminal TAi, it attributes the value of the allocated capacity to the allocation variable TAi.

If, during an out-and-back propagation time, the central terminal TC does not receive any request from the relevant auxiliary terminal, and does not transmit any allocation message to the abovementioned auxiliary terminal TAi, the value of the allocation variable VAi is automatically reset to zero.

The state variable VEi can take only two values, 0 or 1.

It is set to the value 1 when the central terminal VC receives a request from the relevant auxiliary terminal TAi and to the value 0 when the central terminal TC transmits an allocation value to the auxiliary terminal TAi.

This state variable VEi makes it possible to eliminate the redundancy contained in the requests of the auxiliary terminal TAi in the manner below:

If the central terminal TC receives a request from the auxiliary terminal TAi whilst the state variable VEi has the value 0, then the request from the auxiliary terminal TAi is decremented by the current value of the allocation variable VAi.

Such a case is represented at the point A of FIG. 2.

At this point, an allocation request is received, originating from a reservation message generated by the auxiliary terminal TAi, the reservation message denoted MR2. At this point, the reservation request is received whilst the state variable VEi has the value 0. In such a case, the reservation request equal to 9 is decremented by the value of the allocation variable VAi=3 and the new value of the request 6 is then attributed to the transmission capacity load variable of the central terminal in respect of the relevant auxiliary terminal TAi, namely to the variable VCic.

At the point B of the same FIG. 2, a reservation request is received by the reservation message MRp, the state variable VEi having the value 1.

In this case, the reservation request is not changed and the transmission capacity load variable VCic of the central terminal in respect of the corresponding auxiliary terminal TAi then takes the value of the actual reservation request, namely the value 12 in the case of the reservation message MRp.

Execution of the abovementioned procedure upon reception of a reservation request via a reservation message such as the previously cited message MRp originating from the auxiliary terminal TAi is represented in FIG. 4a in which can be perceived a first step 1000 of reading the reservation request, then a step 1001 of testing the value of the state variable VEi relative to the value 0, this test being followed, in the case of a positive response to the latter, by a step 1002 of attribution of the allocation request to the requested value decremented by the value of the allocation variable VAi, then by a step 1003 of attribution, to the load variable for the relevant terminal TAi in the vicinity of the terminal TC, that is to say variable VCic, of the new value of the request thus obtained.

On the contrary, in the case where the response to the test 1001 is negative, the requested value is attributed to the abovementioned variable VCic in a step 1004.

Following the abovementioned steps 1003 and 1004, the state variable VEi is updated to the value 1 in a step 1005, this making it possible next, in a step 1006, to initialize a time delay for the allocation variable TAi in accordance with the procedure for managing a new request stored in the queue for the relevant terminal TAi.

FIG. 4b represents the operations to be performed by the central terminal TC upon transmission of an allocation message MA to the auxiliary terminal TAi.

Thus, following a step 2001 allowing attribution of the allocated capacity to the variable VAi, there is provision for a step 2002 of updating the load variable VCic for the terminal TAi in the vicinity of the central terminal TC, this value being decremented by the value of the relevant allocation variable VAi and the abovementioned step 2002 being followed by a step 2003 of reupdating the state variable VEi, which is set to the value 0. The step 2003 is next followed by a step 2004 of time-delay initialization of the allocation variable VAi according to the same methodology as step 1006 of FIG. 4a.

A more detailed description of an auxiliary terminal for intercommunication by digitized information messages in a network with centralized configuration will be given in connection with FIG. 5a.

From observation of this Figure, it will be noted that the relevant auxiliary terminal TAi comprises, conventionally, a first path (I) including, in cascade, a generator 1 of information messages MI, a circuit 2 for segmenting these messages into data packets Pk, a buffer memory 3 allowing the storage of packets to be transmitted and a transmitter 4 of the abovementioned packets forming the transmitted information messages.

Furthermore, the relevant terminal TAi includes a second path, denoted II, including a transmitter 5 of reservation messages denoted MR, this transmitter being driven by the packet-segmentation circuit 2 and by a transmission delay circuit 6 receiving an acknowledge receipt message, denoted ACK, normally transmitted by the central terminal TC.

It will be noted that, conventionally in the field of satellite telecommunications, the delay circuit is a circuit allowing for example a delay of 300 milliseconds corresponding substantially to an out-and-back journey of a message between a given auxiliary terminal and the central terminal.

In accordance with the subject of the present invention, the abovementioned auxiliary terminal further comprises a circuit, denoted 7, for calculating a transmission capacity load variable in terms of number of packets in the vicinity of the relevant auxiliary terminal TAi.

It will be noted that this calculation circuit receives, on the one hand, a signal delivered by the packet-segmentation circuit 2, this signal being of course representative of the number NP of packets to be transmitted and, on the other hand, a signal representative of the number of time intervals allocated by the last allocation message MAp of order p for example transmitted by the central terminal TC.

According to an advantageous non-limiting embodiment, the calculation circuit 7 can consist of a digital subtractor making it possible to ensure decrementation of the requested value by a quantity corresponding to the allocated value VAi in order to form the request in accordance with step 1002 as represented in FIG. 4a.

In FIG. 5b, a block diagram of a central intercommunication terminal according to the subject of the present invention is represented, allowing implementation of the protocol for multiple access to a telecommunications channel, as described previously, and in which the stability conditions are of course satisfied.

Conventionally, the relevant central terminal TC comprises a reception circuit 10 for the reservation messages MR generated by each relevant auxiliary terminal TAi. This reception circuit may advantageously consist of an error-detection circuit, the detection of an error possibly having the effect of rejecting the relevant reservation message MR and the absence of error detection having the effect of authorizing transmission of the abovementioned reservation message MR to the processing circuits of the central terminal TC.

Conventionally, the central terminal TC comprises a transmitter circuit 11 of acknowledge receipt messages, these messages being denoted ACK.

This circuit is a circuit of conventional type and, as such, will not be described in greater detail.

The central terminal TC finally comprises the hardware elements constituting a circuit for managing the queue of reservation requests consisting of the reservation messages MR accepted by the reception circuit 10. Conventionally, queue management circuit 12 may include a circuit 120 for attributing sequence numbers for the various reservation messages MR received by the central terminal TC, followed by a stack-type storage circuit, denoted 121, allowing storage of the various above-mentioned reservation messages MR according to a specific FIFO type procedure which will be described in greater detail later in the description.

The stack-type storage circuit 121 is then followed by a generating circuit 122 of allocation messages MA. The circuit 122 is of conventional type and will not be described in greater detail.

In accordance with the subject of the present invention, the central terminal further comprises a circuit 13 for updating the transmission load variables VCic of number of packets NP, transmission capacity allocation VAi and of state VEi of allocation requests variables for each auxiliary terminal TAi.

Furthermore, associated with the abovementioned updating circuit 13, is provided a circuit 14 for storing these updated variables.

Advantageously, the updating circuit 13 can consist of a calculator, denoted 130, with which is associated a program module making it possible to ensure the processing of the load variables of transmission capacity VCic, of transmission capacity allocation VAi and of state VEi of allocation requests, in accordance with the procedure previously defined in the description, in accordance with FIGS. 4a and 4b.

It will be noted finally that the procedure for managing the queue of allocation or reservation requests, in accordance with the protocol which is the subject of the invention, can then advantageously be carried out according to an updated FIFO procedure, the sequence number attributed by the circuit 120 to a relevant reservation message, relating to a specified auxiliary terminal TAi, being preserved, and the processing index of this message consequently being preserved, during the procedure for updating the values of the abovementioned variables and during the refreshing of these allocated values in the queue.

For purely illustrative purposes, there will be given, as represented in FIG. 5c, an exemplary form of the messages which may be used in the centralized configuration of the telecommunications network consisting of a central terminal as represented in FIG. 5b and a plurality of auxiliary terminals as represented in FIG. 5a.

Conventionally, the information messages may comprise an address zone, denoted ADR, containing the address of the destination of the message, that is to say that of the relevant auxiliary terminal TAi+q, the information packets Pk being able to reproduce the structure represented in relation to the information message MI.

With the abovementioned address zone ADR is associated a zone INFO containing the useful information.

The reservation messages MR may comprise an identification zone comprising the number of the transmitter terminal NTE, a zone comprising the value of the request, that is to say the variable VCia, this zone being denoted DEM in FIG. 5c, and a zone of error-detection codes, denoted CDE.

The acknowledge receipt message ACK can comprise solely, by way of example, a type zone, denoted TYP, and a zone denoted NTD comprising the number of the addressee terminal.

The allocation message MA can also comprise a type zone denoted TYP representing the type of message, followed by a zone comprising the number of the addressee terminal, and then by a zone comprising the number of time intervals allocated, then by a zone P indicating the position of the first time interval in the relevant data sub-frame.

A more detailed description of a terminal for intercommunications by digitized information messages which is the subject of the present invention in the case in which the network is a network of terminals Ti in a distributed configuration, will now be given in connection with FIG. 6.

In the case of a distributed configuration terminal, this network comprises an arbitrary number M of terminals Ti intercommunicating via a telecommunications channel. This type of network does not then include a central terminal for ensuring management of access of the terminals to the channel.

In such a configuration, there is no allocation message, as in the case of the centralized configuration.

Access to the channel is effected by local decision in the vicinity of each terminal Ti, which, from the point of view of transmission capacity allocation, becomes substantially autonomous.

Thus, a terminal decides to access the channel when its request arrives at the head of the queue of requests. In such a case, however, there is then a request queue management system in the vicinity of each terminal Ti.

In such a case, the various terminals Ti must necessarily update their queue in identical manner so that the decisions relevant to the access privilege to the transmission channel at a given instant are identical.

Thus, each terminal Ti employs the following variables:

A table of variables substantially analogous to the table of variables consisting of the updated variables of the central terminal TC in a centralized configuration. The row of index k of the table, k able to take the values 1 to M, contains the three variables VCk, VEk and YAk relating to a terminal Tk of relevant order k.

Of course, the procedures for updating these variables are identical to those described in relation to the centralized configuration.

Furthermore, a similar time delay system is associated with each terminal Tk in order to ensure management of the allocation variable TAk, this time delay system operating in the same way as in the case of the centralized configuration.

A local load variable, denoted VCli, is employed and corresponds to the load variable VCia of the centralized configuration.

It is then understood that the architecture of a terminal Ti in the distributed configuration boils down to a combination of the auxiliary terminal TAi and of the central terminal TC of the centralized configuration in connection with FIGS. 5a and 5b.

The only major difference resides in the fact that, instead of the allocation procedure, the terminal Ti implements a decision procedure regarding the access privilege to the telecommunications channel at a given instant. It is then apparent that, if at a given moment, all the request queues of the network contain the same information, all the terminals Ti may, at this instant, make the same decision.

It will then be understood that, as represented in FIG. 6, in the case of terminals Ti in distributed configuration, each terminal includes a first path, denoted I, comprising the same elements as in the case of FIG. 5a, these same elements bearing the same references preceded by the digit 2.

In the same way, the terminal Ti includes a second path comprising elements substantially identical to those represented in FIG. 4a, these same elements comprising the same references preceded by the digit 2.

In the case of FIG. 6 however the circuit 27 for calculating the variable VCLi allows calculation of the transmission capacity local load variable of the number of packets in the vicinity of the relevant terminal Ti, this local load variable being substituted for the load variable VCia previously described in connection with FIG. 4a.

The terminal Ti further comprises in succession the circuits 210 for receiving reservation messages MR generated by each other terminal Tk and which are analogous to the circuit 10 of FIG. 4a, the circuit 212 for managing the queue of reservation requests of transmission capacities of the terminals which are analogous to the circuit 12 of FIG. 4a and finally the circuits 213 for updating the transmission load variables of the number of packets VCc of transmission capacity allocation VA and of allocation request state VE as well as the circuit 214 for storing these updated variables.

Of course, management of the queue is then carried out according to a FIFO procedure updated by the values of the abovementioned updated variables.

There has thus been described a protocol for multiple access to a telecommunications channel which is particularly advantageous, this multiple access protocol being able to be implemented from networks with centralized configuration, that is to say comprising a central terminal for managing access or from a telecommunications network with distributed configuration, the decision of access to the channel being taken in the vicinity of each relevant terminal The protocol for multiple access to a telecommunications channel which is the subject of the present invention is particularly advantageous insofar as the stability conditions of the ALOHA multiple access procedures are greatly improved, this making it possible to avoid the processes of uncontrolled self-locking of this type of network during conditions of very substantial traffic.

We claim:

1. A protocol for providing multiple access to a telecommunications channel from auxiliary communication terminals and a central terminal, one of said auxiliary communication terminals being a current auxiliary communication terminal which sends a reservation message to said central terminal and said central terminal sending in turn an allocation message to said current auxiliary communication terminal, said allocation message being related to an information message to be generated by said current auxiliary communication terminal from a plurality of successive elementary information messages to be sent to another one of said auxiliary communication terminals, said current auxiliary communication terminal being thus subjected to successive reception of allocation messages sent by said central terminal, and to transmission of reservation messages to said central terminal and of information messages to said other auxiliary communication terminals, said protocol for said current auxiliary communication terminal comprising:

storing, in said current auxiliary communication terminal, said successive elementary information messages as a set of earlier, not yet transmitted, information messages;

sending to said central terminal at least one of said reservation messages of a first transmission order related to said set of earlier, not yet transmitted, successive elementary information messages, which are stored between the previous instant of reception by said current auxiliary communication terminal of an allocation message of a second transmission order which is lower than said first transmission order and the instant of transmission by said current auxiliary terminal of said at least one of said reservation messages of said first order; and sending to another auxiliary communication terminal an information message of a third transmission order, which is higher than said first transmission order, after said current auxiliary communication terminal receives, from said central terminal, an allocation message of a fourth transmission order, which is higher than said first transmission order and lower than said third transmission order.

2. The access protocol as claimed in claim 1, wherein said third transmission order equals said fourth transmission order plus one.

3. The access protocol as claimed in claim 1, wherein each of said successive elementary information messages forming said information message, are of any length and are subdivided into data packets of arbitrary fixed length.

4. The access protocol as claimed in claim 3, wherein each reservation message of said first transmission order transmitted by said current auxiliary communication terminal contains an item of information representing the number of data packets stored within said current auxiliary communication terminal and queuing information for transmission to said another auxiliary communication terminal.

5. The access protocol as claimed in claim 1 wherein each allocation message is formed from a transmission capacity load variable of said current auxiliary communication terminal, within said central terminal.

6. The access protocol as claimed in claim 5, wherein said transmission capacity load variable within said central terminal includes a memory allocation sub-variable dedicated to said current auxiliary communication terminal having generated said reservation message, and a status sub-variable characterizing the status of request or of absence of request for memory allocation of said current auxiliary communication terminal.

7. The access protocol as claimed in claim 6, wherein said reservation message of said first order comprises a transmission capacity load variable in terms of number of data packets, generated within said current auxiliary communication terminal, said access protocol further comprising:

updating said transmission capacity load variable; and
incorporating said transmission capacity load variable with said reservation message after each creation and storage by said auxiliary communication terminal of an elementary information message and its corresponding data packets, or after the reception of an allocation message.

8. The access protocol as claimed in claim 6, wherein in order to eliminate the redundancy contained in the requests for memory allocation of said current auxiliary communication terminal, said status sub-variable characterizing the status of request or absence of request for memory allocation for said current auxiliary communication terminal is a binary variable taking the values 0 or 1, said protocol further comprising decrementing said current auxiliary communication terminal request by the current value of said memory allocation sub-variable when said status sub-variable has the value zero.

9. An auxiliary terminal for intercommunication by digital information messages in a network of auxiliary communication terminals managed by a central terminal, according to a multiple access protocol, one of said network auxiliary communication terminals being a current auxiliary communication terminal sending a reservation message of a given transmission order and said central terminal sending to each auxiliary communication terminal an allocation message of a subsequent transmission order successively, said digital information messages being generated through concatenation from a plurality of successive elementary information messages, each made up of data packets, to be sent to another one of said auxiliary communication terminals, said current and said another auxiliary communication terminals comprising at least one first path comprising, in cascade, an information message generator, a circuit for segmenting an information message into data packets, a buffer memory for storing said data packets and a transmitter for transmitting generated information messages, and a second path comprising a reservation message transmitter driven by the data packet segmenting circuit and by a transmission delay circuit receiving an acknowledge receipt message generated by said central terminal, said current auxiliary communication terminal further comprising:

a circuit, connected to said data packet segmenting circuit, for calculating a transmission capacity load variable from the number of said data packets stored within said buffer memory of said current auxiliary terminal, said circuit receiving a signal, delivered by the packet segmenting circuit, representing the number of data packets to be transmitted and a signal representing the number of time intervals allocated by said allocation message of said given order transmitted by said central terminal.

10. A central terminal for intercommunication by digital information messages in a network of auxiliary communication terminals managed by a central terminal according to a multiple access protocol, each auxiliary communication terminal sending a reservation message of a given transmission order to said central terminal and said central terminal sending to each auxiliary terminal an allocation message of a subsequent transmission order, successively, said digital information messages being generated by a current auxiliary communication terminal through concatenation from a plurality of successive elementary information messages, each made up of data packets to be sent to another auxiliary communication terminal, said central terminal comprising:

a circuit for receiving said reservation messages generated in turn by each current auxiliary communication terminal;
a circuit, connected to said receiving circuit, for generating an acknowledge receipt message output to said current auxiliary communication terminal when said receiving circuit indicates said reservation messages have been received;
a circuit, connected to said receiving circuit, for managing said reservation messages of said current auxiliary communication terminal and outputting allocation messages;
a circuit, connected to said receiving circuit, for updating, for each current auxiliary communication terminal, load variables of transmission, of the number of data packets, of transmission capacity allocation and of allocation request status, outputting said load variables as updated variables; and
a circuit for storing these updated variables, said managing circuit, receiving said updated variables output from said updating circuit, including means for carrying out management of said reservation messages according to a FIFO procedure updated by the values of said updated variables.

11. The central terminal as claimed in claim 10, wherein said updating circuit comprises a calculator for receiving said reservation messages, and having a program module for ensuring processing of the load variables of transmission capacity, of transmission capacity allocation and of status.

12. In a system for intercommunication by digital information messages including a network of terminals arranged in a distributed configuration, each of said terminals comprising:

a first path comprising, connected in cascade, a generator for generating information messages, a circuit for segmenting said messages into data packets, a buffer memory for storing said data packets and a transmitter for transmitting the information messages;
a second path comprising a reservation message transmitter driven by the packet segmenting circuit and a delay control circuit for controlling said reservation message transmitter;
a calculating circuit for calculating a transmission capacity local load variable of the number of packets stored within said buffer memory of the current terminal, said calculating circuit receiving a signal, delivered by said data packet segmenting circuit, representing the number of data packets to be transmitted, and a signal, from said transmitter for transmitting information messages, representing the number of data packets authorized for transmission;
a circuit for receiving said reservation messages generated by other terminals in said network;
a circuit, connected to said receiving circuit, for managing said reservation messages of the terminals and outputting said allocation messages;
a circuit, connected to said receiving circuit, for updating the load variables of transmission, of the number of packets, of transmission capacity allocation, and of allocation request status, outputting updated load variables; and
a circuit for storing said updated load variables, said managing circuit, receiving said updated load variables form said updating circuit, including means for carrying out the management of said reservation messages according to a FIFO procedure updated by values of said updated load variables.

* * * * *